Patented Apr. 4, 1944

2,345,605

UNITED STATES PATENT OFFICE 2,345,605

CHROMANES AND PROCESS FOR THEIR PRODUCTION

Walter John, Gottingen, and Philipp Günther, Kassel, Germany, assignors to Merck & Co., Inc., Rahway, N. J., a corporation of New Jersey No Drawing. Application June 25, 1941, Serial No. 399,678. In Germany December 6, 1938

6 Claims. (Cl. 260—333)

This invention relates to new chemical compositions and compounds and to methods of producing the same.

More particularly, it relates to the production of substituted chromanes having the biological activity of tocopherols, i. e., vitamin E, intermediates for the production of such chromanes, and to methods for producing such compounds.

The compounds obtained by the process of the present invention have the general formula I 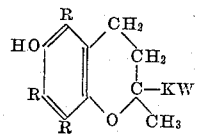

where R may be a methyl group, or two of the radicals R may be methyl groups, and the remaining R may represent hydrogen, and KW is any monovalent hydrocarbon radical.

The syntheses now known for the production of compounds of the Formula I involve the condensation of di- or trimethylhydroquinone with phytol or its derivatives, such as phytyl bromide or phytadiene. When phytol, or its derivatives, is employed in the reaction according to the known syntheses, products of Formula I are obtained, where KW is trimethyltridecyl. The extension of these known syntheses to the production of other compounds of the general Formula I where KW is a radical other than trimethyltridecyl, is not practically feasible, because only a very limited number of $\alpha,\beta$-unsaturated alcohols, similar to phytol, are available.

It is known that a number of compounds which differ in constitution from $\alpha$-tocopherol exhibit the biological action of vitamin E, and it is therefore desirable to have available practical syntheses for compounds having the general Formula I, but wherein KW is an optional radical. Such compounds may be produced according to the processes described herein.

As starting materials according to our invention may be employed a dihydrocoumarin having the formula II 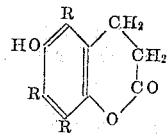

where R may represent a methyl group, or two R's may represent methyl groups, the remaining R representing hydrogen.

The dihydrocoumarin is reacted with a mixture of methyl magnesium halide and the Grignard compound from a higher halogenated hydrocarbon.

According to another modification of our invention, ketones having the formula

III 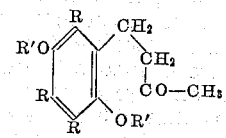

where R may represent a methyl radical, or two R's may represent methyl groups, and the remaining R may be a hydrogen atom, and R' is a hydrocarbon radical, may be treated with an organomagnesium halide, whereby a tertiary alcohol is formed, which either spontaneously or through the action of dehydrating agents, is converted to the desired chromane.

In the first case, for example, 3,4-dihydro-5,7,8-trimethyl-3-hydroxycoumarin (Smith et al., Journal American Chemical Society, vol. 48, page 1693, et seq., 1926; vol. 58, page 306, et seq., 1936) may be employed. This saturated lactone may be reacted with a mixture of methyl-magnesium halide, and another alkyl magnesium halide to produce a chromane substituted in the 2-position with two alkyl radicals which may be the same or different alkyl radicals. The chromane is preferably separated out from the mixture of the reaction products in the form of an allophanate.

In the second case, for example, 1,4-dimethoxy-2,5,6-trimethyl-3-(gamma-keto-n-butyl)-benzene may be reacted with an organomagnesium halide, whereby the ether groups are split up and the keto group is converted into a tertiary alcohol group. This tertiary alcohol usually is converted spontaneously into the corresponding chromane.

The processes of our invention are illustrated by the following specific examples, but it will be apparent to those skilled in the art that many modifications may be made therein as to the starting materials, etc., without departing from the spirit and scope of the invention and claims.

Example I

Grignard solutions from 0.486 gm. of magnesium and 5.0 gms. of dodecyl bromide in 15 cc. of ether, and from 0.365 gm. of magnesium and 2.16 gms. of methyl iodide in 10 cc. of ether are prepared. The two solutions are combined, diluted with 10 cc. of benzene and 10 cc. of anisole, and the mixture is allowed to run during the course of several minutes, with vigorous stirring and while bubbling through nitrogen, into a solution of 1.03 gms. of dihydrocoumarin in 30 cc. of benzene and 15 cc. of anisole, heated to about 40° C. A voluminous precipitate is developed. The mixture is heated to the boiling point, whereby the precipitate decreases in volume. The main portion of the ether is then filtered off by applying a mild vacuum, and the boiling is continued for three hours under refluxing, whereby the precipitate is dissolved almost completely. Then while avoiding the entrance of air, all solvents are evaporated under vacuum. The remaining light-gray residue is treated in a vessel with continuous outside water cooling with a cooled mixture of 30 cc. of ethanol and 20 cc. of concentrated hydrochloric acid, whereby it is gradually dissolved with slight warming. When solution is complete, it is boiled under refluxing for one quarter hour, while bubbling hydrochloric acid gas through simultaneously; during this procedure the solution must remain almost completely homogeneous, without appreciable quantities of oil separating. On boiling, the solution turns a faintly yellowish brown color; if the reaction product has repeatedly come into contact with air, the color will be dark brown. The product is taken up in benzene, the aqueous portions are washed again with benzene, the combined benzene solutions are washed with water and bicarbonate solution and are dried with sodium sulfate. The thus obtained benzene solution is made up to a volume of 50 cc., passed through an aluminum oxide column about 15 cm. high and with a diameter of 3 cm., and washed with benzene. The following fractions are obtained:

(1) A light yellow filtrate containing a large quantity of hydrocarbon $C_{24}H_{50}$.
(2) A faintly brownish zone which is frequently scarcely visible. This layer likewise is readily eluted with benzene into the filtrate; it contains the main amount of dodecyl-tetramethylhydroxy-chromane.
(3) The benzene filtrate following thereafter is colored very slightly and contains a mixture of chromanes.
(4) The fraction retained in the chromatogram contains only very little chromane mixture.

The substance contained in fraction 2 is dissolved in alcohol, any hydrocarbon $C_{24}H_{50}$ still present remains behind and is filtered off. When well cooled, some semi-solid material which separate first, melts at room temperature, and may be identified as didodecyl-trimethyl-hydroxy-chromane. After prolonged standing, dodecyl-tetramethyl-hydroxy-chromane separates out in the form of bunches of fine feathery crystals. It is recrystallized from alcohol and finally melts at 60–61° C. Altogether, chiefly from fraction 2, to a lesser extent from fraction 3, 200–250 mg. dodecyl-tetramethyl-hydroxy-chromane are obtained. The ultra-violet absorption spectrum of the chromane with a melting point of 61° C. corresponds to that of α-tocopherol, and its behavior towards silver nitrate is similar.

The allophanate of dodecyl-tetramethyl-hydroxy-chromane melts at 180° C.; it crystallizes from methanol in the form of fine needles.

*Example II*

1.4 gms. of p-dimethoxy-trimethyl-benzaldehyde (Smith, Journal American Chemical Soc., vol. 56, page 472, et seq., 1934) is dissolved in 10 cc. of 70% acetone, treated with 1 cc. of 1 N sodium hydroxide and mechanically shaken at room temperature. After about 10 minutes the solution becomes turbid and a faintly yellowish product separates out. After shaking for about three hours, the precipitate is filtered off; it melts at 188° C. after recrystallization from acetone. According to its analytical composition, this product is a dibenzylidene derivative. The filtrate is neutralized with $H_2SO_4$ and is then extracted with ether. The material obtained from the ether extraction is crystallized from petroleum ether with strong cooling (freezing mixture). It occurs in the form of faintly yellowish crystals having a melting point of about 61–62° C. The yield of benzylidene acetone derivative is 80 to 90%; the yield of dibenzylidene acetone derivative is 10–15%.

500 mg. of the compound with a melting point of 62° C. is hydrogenated in 30 cc. of pure alcohol in the presence of about 500 mg. palladium black, until all of the hydrogen is taken up (about one hour). The solution is diluted with water, the hydrogenation product is extracted with ether and is recrystallized from aqueous methanol. 1,4-dimethoxy-2,5,6-trimethyl-3-(gamma-keto-n-butyl)-benzene is obtained in the form of fine soft needles having a melting point of 76° C. in better than 95% yield.

600 mg. of the hydrogenation product with a melting point of 76° C. is dissolved in 5 cc. of absolute ether and is added drop by drop to a Grignard solution prepared from 400 mg. of methyl iodide and 80 mg. of magnesium in 5 cc. of ether, and boiled under refluxing for about three hours. It is then decomposed in the usual manner with ice and hydrochloric acid, extracted with ether, and then the concentrated residue from the ether extraction is boiled under refluxing for about three hours with 10 cc. of glacial acetic acid and 3 cc. of hydrobromic acid (density=1.49). After cooling, it is treated with water, extracted with ether, the ether is washed and dried. The colorless residue remaining after evaporation of the ether crystallizes spontaneously. From petroleum ether, well-defined crystals having a melting point of about 93° C. are obtained, which by their mixed melting point and their ultraviolet absorption are found to be identical with 2,2,5,7,8-pentamethyl-6-hydroxy-chromane.

By proper modification of the organomagnesium halide used in treatment of the hydrogenation product as in Example II, other chromanes of Formula I, in which KW is a monovalent higher hydrocarbon radical, may be prepared. Thus, for instance, if dodecyl magnesium bromide is substituted for the methylmagnesium iodide specifically exemplified in Example II, 2,5,7,8-tetramethyl-2-N-dodecyl-6-hydroxy chromane is obtained as end product. The esters, as for instance the allophanate, of this chromane are prepared as described in Example I.

This application is a continuation-in-part of our co-pending application Serial No. 306,120, filed November 25, 1939, Patent 2,245,147.

We claim:
1. The process for the production of compounds of the general formula

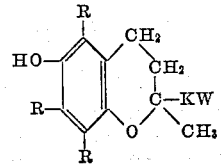

where R is selected from the group consisting of hydrogen and methyl, and KW is any monovalent hydrocarbon radical, which comprises reacting a ketone of the formula

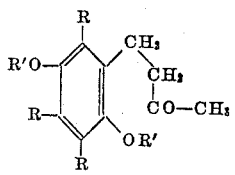

where R is selected from the group consisting of hydrogen and methyl, and R' is a hydrocarbon radical, with an organomagnesium halide.

2. The process for the production of compounds of the general formula

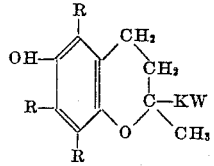

where R is selected from the group consisting of hydrogen and methyl, and KW is any monovalent hydrocarbon radical, which comprises reacting 1,4-dimethoxy-2,5,6-trimethyl-3-(gamma-keto-n-butyl)-benzene with an organomagnesium halide.

3. The process for the production of 2,5,7,8-tetramethyl-2-N-dodecyl-6-hydroxy chromane which comprises reacting 1,4-dimethoxy-2,5,6-trimethyl - 3 - (gamma-keto-n-butyl) - benzene with dodecyl magnesium halide.

4. The process for the production of compounds of the general formula

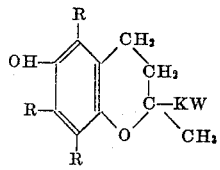

where R is selected from the group consisting of hydrogen and methyl, and KW is a dodecyl radical, which comprises reacting a ketone of the formula

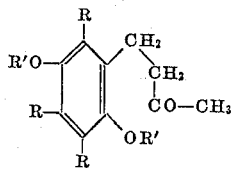

where R is selected from the group consisting of hydrogen and methyl, and R' is a hydrocarbon radical, with dodecyl magnesium bromide.

5. The process for the production of 2,2,5,7,8-pentamethyl-6-hydroxy chromane which comprises reacting 1,4-dimethoxy-2,5,6-trimethyl-3-(gamma-keto-n-butyl)-benzene with methyl magnesium halide.

6. The process for the production of compounds of the general formula

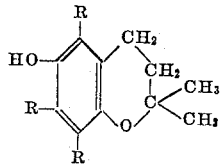

where R is selected from the group consisting of hydrogen and methyl, which comprises reacting a ketone of the formula

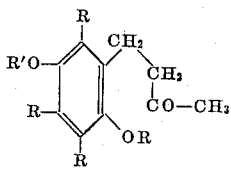

where R is selected from the group consisting of hydrogen and methyl, and R' is a hydrocarbon radical, with methyl magnesium halide.

WALTER JOHN.
PHILIPP GÜNTHER.

CERTIFICATE OF CORRECTION.

Patent No. 2,345,605.  April 4, 1944.

WALTER JOHN, ET AL.

It is hereby certified that error appears in the printed specification of the above numbered patent requiring correction as follows: Page 2, first column, line 53-54, for "separate" read --separates--; page 3, second column, line 38, claim 6, in the formula, for "OR" read --OR'--; and that the said Letters Patent should be read with this correction therein that the same may conform to the record of the case in the Patent Office.

Signed and sealed this 30th day of May, A. D. 1944.

Leslie Frazer

(Seal)  Acting Commissioner of Patents.